(12) United States Patent
Weintraub et al.

(10) Patent No.: US 7,359,556 B2
(45) Date of Patent: Apr. 15, 2008

(54) ENHANCEMENT OF COMPRESSED IMAGES

(75) Inventors: Reuven Weintraub, Ein-Ayala (IL); Ido Hadanny, Kiryat-Uno (IL)

(73) Assignee: Gidel Imaging Ltd., Moshav Evin-Ayala (IL)

( * ) Notice: Subject to any disclaimer, the term of this patent is extended or adjusted under 35 U.S.C. 154(b) by 484 days.

(21) Appl. No.: 10/974,398

(22) Filed: Oct. 26, 2004

(65) Prior Publication Data

US 2005/0058354 A1 Mar. 17, 2005

Related U.S. Application Data

(62) Division of application No. 09/889,453, filed as application No. PCT/IL99/00025 on Jan. 14, 1999, now Pat. No. 6,983,073.

(60) Provisional application No. 60/115,863, filed on Jan. 13, 1999.

(51) Int. Cl.
*G06K 9/36* (2006.01)

(52) U.S. Cl. .................................................. 382/232

(58) Field of Classification Search ........ 382/250–251, 382/254, 268, 232–233, 239, 248; 375/240.01–240.03, 375/240.18–240.2, 240.24; 358/426.01–426.16
See application file for complete search history.

(56) References Cited

U.S. PATENT DOCUMENTS 5,881,180 A * 3/1999 Chang et al. ............... 382/268

FOREIGN PATENT DOCUMENTS

| EP | 0 401 854 | 12/1990 |
|---|---|---|
| EP | 0 849 936 | 6/1998 |
| WO | WO 97/40627 | 10/1997 |

OTHER PUBLICATIONS

Kutka, R. et al.; "Quality Improvement Low Data-Rate Compressed Video Signals by Pre- and Postprocessing"; Oct. 7, 1996; pp. 42-49; Proceedings of the SPIE; vol. 2952; KP00077127.

Rensheng, H. et al.; "A Fast DCT Block Smoothing Algorithm"; 1995; pp. 1-6; Visual Communication and Image Processing Annual Meeting Proceedings, SPIE; vol. 2501; Paper 5; Retrieved from the Internet at <http://olias.arc.nasa.gov/publications/abumada/vcip95.html>.

* cited by examiner

*Primary Examiner*—Ishrat Sherali
(74) *Attorney, Agent, or Firm*—EMPK & Shiloh, LLP

(57) ABSTRACT

A method is provided for recovering an image defined as a function of image coordinates of an image space from compressed data that is a function of transform coordinates in a transform space comprising: a) transforming the compressed data using at least one partial transform to generate a set of intermediate coefficients in a space intermediate between the transform space and said image space; b) adjusting the value of at least one intermediate coefficient and using said adjusted value to generate a set of adjusted intermediate coefficients; and c) recovering the image by transforming the set of adjusted intermediate coefficients to the image space with at least one additional partial transform.

5 Claims, 2 Drawing Sheets

ENHANCEMENT OF COMPRESSED IMAGES

RELATED APPLICATIONS

The present application is a Divisional application of U.S. application Ser. No. 09/889,453 filed on Jul. 13, 2001 now U.S. Pat. No. 6,983,073, which is a US national application of PCT/IL99/00025, filed on Jan. 14, 1999 and claims the benefit under 35 U.S.C. Section 119(e) of US Provisional Application No. 60/115,863 filed on Jan. 13, 1999.

FIELD OF THE INVENTION

The present invention relates to processing compressed data and in particular to processing compressed data representing images.

BACKGROUND OF THE INVENTION

Still and moving images generally contain large amounts of information. For example, an RGB color image comprising 2000×2000 pixels requires 12 megabytes of data if the intensity of each RGB color component of each pixel is coded with 8 bits. Transmission and storage of this amount of data even for single images is generally impractical for most purposes. For example, if images of this size are to be transmitted at typical moving picture rates of thirty frames per second, then 360 megabytes of image data must be transmitted every second. This is clearly a very large rate of data transmission. Therefore, data representing an image is generally "compressed". Compression significantly reduces the amount of data representing the image in comparison to the amount of data required to represent the image by coding RGB intensities (or intensities of a different set of color components used for defining color) for each pixel of an image. Hereinafter, the intensity of a color component used to define color of a pixel in an image is referred to as a "pixel value".

Different techniques exist for compressing data and in particular for compressing data representing an image. In many of these techniques the image is first partitioned into a plurality of contiguous, non-overlapping, sub-images or tiles wherein each sub-image extends over a portion of the area of the full image. Variation of image intensity and color over the area of a sub-image is generally limited. For each color component used to define color in the image, pixel values of each sub-image are transformed into a set of values, hereinafter referred to as "transform coefficients", in a transform space. Generally, the pixel values are transformed by operating on the pixel values with a unitary separable transform. The pixel values are recoverable from the transform coefficients by operating on the transform coefficients with an inverse of the transform. Among well known separable unitary transforms used in processing image data are the Fourier, cosine, sine and Hadamard transforms.

Generally, the number of transform coefficients needed to effectively recover the pixel values is considerably less than the number of pixel values. The amount of data needed to code the transform coefficients is therefore generally significantly less than the amount of data needed to code the pixel values. Representing the image using the transform coefficients therefore requires considerably less data than representing the image by coding color component intensities for each pixel. The transform thus succeeds in compressing the image data.

Usually, the transform coefficients are quantized by dividing each transform coefficient by a "quantizer". Any remainder resulting from the division is rounded up or down and the transform coefficient is replaced by the quotient. Different transform coefficients are generally quantized with quantizers of different magnitudes. Often the magnitude of a quantizer is determined as a function of an error margin for the value of the transform coefficient that the quantizer is used to quantize, which error margin is estimated from known error margins of the pixel values.

Transform space data representing the image after quantizing the transform coefficients comprises the quantized transform coefficients and the quantizer, or a way of determining the quantizer, for each quantized transform coefficient. When recovering the image, i.e. when recovering the pixel values, a transform coefficient, hereinafter referred to as a "recovered transform coefficient", is recovered from each quantized transform coefficient by multiplying the quantized transform coefficient by its quantizer. The recovered transform coefficients are operated on by an inverse of the transform used to generate the transform coefficients, to determine the pixel values.

Quantization increases the compression of the image data beyond that achieved with the transform. Quantization reduces the range of different numbers representing the transform coefficients, which reduces the number of bits required to code the coefficients. In addition some of the coefficients (those that are less than one half their quantizer) are quantized to zero, which reduces the number of coefficients used to recover the original pixel values. Increasing quantizer magnitudes decreases the possible different values of quantized transform coefficients and increases the number of transform coefficients that are quantized to zero. Increasing quantizer magnitudes therefore generally increases the extent to which image data is compressed.

However, unlike compression resulting from a non-quantized unitary transform, compression from quantization is "lossy". Information contained in the remainders discarded in the quantization process is lost and the larger the quantizer magnitudes the more lossy is the compression. The recovered transform coefficients are different from the transform coefficients by a quantization error. As a result, pixel values generated using quantized transform coefficients differ from the original pixel values.

The steps in the industry standard JPEG system for compressing color and gray tone images illustrates a typical data compression procedure for a color image. In JPEG a color image is generally partitioned into square tiles of 8×8 pixels. Color of the image is usually defined using YUV color components, so that each pixel has Y, U and V pixel values. For each tile, for each of the YUV color components, the pixel values of the color component are transformed into a set of transform coefficients using a discrete cosine transform. The transform coefficients are then quantized. Usually the transform coefficients associated with higher spatial frequencies are quantized with larger quantizers.

To illustrate the process, let $Y(x,y)$ represent luminance pixel values in a tile, where x and y are integer coordinates that locate a pixel in the tile as being in the x-th row and y-th column of the tile. The transform coefficients are functions of two integer transform space coordinates, "u" and "v" that are conjugate coordinates of x and y respectively.

If C(u,v) represents the transform coefficients, then $$C(u, v) = \sum_{y=0}^{7}\sum_{x=0}^{7} DCT(u, v, x, y)L(x, y)$$

where DCT(u,v,x,y) symbolically represents the discrete cosine transform. Writing the discrete cosine transform explicitly gives:

$$C(u, v) = A(u)A(v)\sum_{y=0}^{7}\sum_{x=0}^{7} L(x, y)\cos((2x + 1)u\pi/16)\cos((2y + 1)v\pi/16),$$

where $A(w)=1/\sqrt{2}$ for w=0 and 1 otherwise. Each C(u,v) is then quantized with a quantizer, Q(u,v), yielding a quantized transform coefficient QC(u,v)=INT{[C(u,v)±Q(u,v)/2]/Q(u, v)}, where the + is used if C(u,v)>0, the minus is used if C(u,v)<0 and INT represents rounding the result to the nearest integer.

To recover pixel values for luminance from the QC(u,v), recovered transform coefficients, RC(u,v), are calculated where RC(u,v)=QC(u,v)Q(u,v). The recovered transform coefficients are then transformed back with the inverse discrete cosine transform represented by IDCT(x,y,u,v), so that recovered luminance values RY(x,y) may be written:

$$RY(x, y) = \sum_{u=0}^{7}\sum_{v=0}^{7} IDCT(x, y, u, v)RC(u, v).$$

Explicitly, $$RY(x, y) = A(u)A(v)\sum_{u=0}^{7}\sum_{v=0}^{7} RC(u, v)\cos((2x + 1)u\pi/16)\cos((2y + 1)v\pi/16).$$

The recovered value for luminance RY(x,y) is generally not equal to Y(x,y) because the quantization process has resulted in a loss of information so that generally RC(u,v)≠C(u,v).

In many instances, information lost in quantizing transform coefficients does not affect the quality of an image recovered from the transform coefficients to an extent that renders the image unusable for the purpose for which it was intended. However, in many instances the loss of information results in objectionable degradation of the recovered image. Often, unwanted artifacts are generated in the recovered image and often the image is degraded unacceptably. For example, a set of compressed transform coefficients might be useable to provide a good "thumbnail" image of a scene but as a result of information loss the transform coefficients may be totally inadequate to provide an enlarged image of the scene.

Techniques exist for adjusting images recovered from compressed data so as to reduce effects on the quality of the recovered image that result from information loss and error in the compressed data. Some techniques address specific types of defects or artifacts, for example "blocking artifacts", that are generated in images recovered from compressed data that has lost information. Other techniques apply algorithms to reduce pixel to pixel discontinuities or to improve image sharpness by edge enhancement. Most such techniques have limitations. For example, edge-enhancing algorithms typically increase noise in a recovered image and smoothing algorithms tend to blur an image. There is a need for new techniques for recovering images from compressed data that compensate for information loss or errors in the compressed data.

Whereas the above discussion has focused on data representing two dimensional images comprising pixels and associated pixel values of color components or gray tones, it should be realized that the discussion also applies to three dimensional data sets comprising voxels and corresponding "voxel values". Quite generally, the present discussion is germane to n-dimensional images. An n-dimensional image is defined as a set of values, hereinafter referred to as "image values", that are dependent on n independent coordinates, which coordinates define an n-dimensional image space. Furthermore it should be noted that the definition of an n-dimensional image is quite general and an n-dimensional image is not restricted to a video image, it means, among other things, a sound image as well. For example a three dimensional sound image might be the notes in a sound file that are a function of time and two stereo channels.

Compression of data representing an n-dimensional image can be similar to compression of a two dimensional video image comprising pixel values as illustrated with the JPEG example. Image values of the n-dimensional image are transformed preferably by a separable unitary transform into a set of transform coefficients dependent upon transform space coordinates of an n-dimensional transform space. The transform coefficients are then quantized using appropriate quantizers. Each of the transform space coordinates is conjugate to a different one of the coordinates of the image space. An image is recovered from transform coefficients by dequantizing the quantized transform coefficients to determine recovered transform coefficients and operating on the recovered transform coefficients with an inverse of the unitary transform. As in the case of two dimensional images the recovered image is degraded by loss of information, or error in the recovered transform coefficients and techniques are needed to compensate for the information loss.

SUMMARY OF THE INVENTION

An aspect of preferred embodiments of the present invention relates to providing a method for adjusting compressed data comprising quantized transform coefficients generated by transforming image data, preferably, with a separable unitary transform. The method is useable to moderate deleterious effects on an image recovered from the compressed data that result from information loss and/or error in the compressed data.

Aspects of some preferred embodiments of the present invention relate to processing compressed data that represents an n-dimensional image.

In accordance with aspects of some preferred embodiments of the present invention the method relates to processing compressed data generated from two and three-dimensional images.

Aspects of some preferred embodiments of the present invention relate to processing compressed data generated by compressing image data using the JPEG system and derivatives of the JPEG system such as MPEG and related and similar compression schemes such as H261, H263, H323, PX64 and HDTV.

Preferably, the transform used to compress the data is separable so that it can be decomposed into a set of partial transforms that operate sequentially to transform the image values into the transform coefficients. A first partial transform operates on the image data and generates a set of first partial transform coefficients. A second partial unitary transform operates on the set of first partial transform coefficients to generate a set of second partial transform coefficients. The procedure continues with each partial transform operating on partial transform coefficients generated by the preceding partial transform. The results of the last partial transform are the transform coefficients. In the process of transforming the data each partial transform converts at least one coordinate of the image space into its conjugate transform coordinate in the transform space. The transform can thus be decomposed into, at most, n partial transforms in which each partial transform converts one different image space coordinate into its transform space coordinate.

The inverse transform can preferably be decomposed into corresponding partial inverse transforms in which each partial inverse transform is an inverse of a corresponding partial transform. In preferred embodiments of the present invention, the partial inverse transforms operate sequentially to "roll back" the results of the partial transforms, each partial inverse transform rolling back the results of a corresponding partial transform. If a partial transform generates a set of third partial transform coefficients from a set of second partial transform coefficients then its corresponding partial inverse transform generates the set of second transform coefficients from the set of third transform coefficients.

Each partial transform coefficient, hereinafter referred to as a "partial coefficient", is a function of at least one transform space coordinate and at least one image space coordinate. Partial coefficients generated by a same sequence of partial transforms and/or partial inverse transforms are functions of the same transform space coordinates and the same image space coordinates and are said to belong to a same set of partial coefficients. While in preferred embodiments of the present invention both transforms have the above characteristics, in other preferred embodiments of the present invention only the inverse transform is required to be separable in that the total inverse transform can be achieved by operation on the compressed data by a sequence of partial inverse transforms.

In accordance with a preferred embodiment of the present invention the compressed data is adjusted by adjusting at least one partial coefficient to provide at least one adjusted partial coefficient. The at least one adjusted partial coefficient is used in place of the at least one partial coefficient in recovering an image from the transform coefficients.

For at least one partial coefficient an adjustment limit is preferably determined that is used to set an upper and lower bound for the amount by which the partial coefficient may be increased or decreased by an adjustment. The range of values determined by the upper and lower bound are hereinafter referred to as an "adjustment range". The adjustment comprises using an adjustment algorithm to assign a value to the at least one partial coefficient that lies in the adjustment range. Using the algorithm does not necessarily result in a change in the value of the at least one partial coefficient. In some cases the result of using the algorithm is to leave the value of the at least one partial coefficient unchanged.

According to an adjustment algorithm used in some preferred embodiments of the present invention, the value of the at least one partial coefficient is adjusted so as to moderate at least one apparent anomaly in values of partial coefficients belonging to the set of partial coefficients to which the partial coefficient belongs.

According to an adjustment algorithm used in some preferred embodiments of the present invention, the value of the at least one partial coefficient is adjusted so as to conform to ratios between other partial coefficients in the same set of partial coefficients.

According to an adjustment algorithm used in some preferred embodiments of the present invention, the value of the at least one partial coefficient is adjusted to conform to a trend in changes in values of partial coefficients as a function of at least one of the transform space coordinates or one of the image space coordinates.

According to an adjustment algorithm used in some preferred embodiments of the present invention, the value of the at least one partial coefficient is adjusted to conform to a predetermined pattern relating values of partial coefficients.

For compressed data representing color images, such as, for example, data compressed using JPEG, MPEG and derivative compression systems, in some preferred embodiments of the present invention, the value of at least one partial coefficient for one color component is adjusted responsive to at least one value of a transform coefficient or a partial coefficient for a different color component. For example a partial coefficient for a chrominance component U or V may be adjusted using partial coefficients for luminance Y.

Quite generally, if first and second sets of compressed data are from related images then recovered coefficients and/or partial coefficients generated from the first set of compressed data may be adjusted, in accordance with a preferred embodiment of the present invention, responsive to recovered coefficients and or partial coefficients of the second set of compressed data.

In some preferred embodiments of the present invention, if the value of at least one partial coefficient is changed in a set of partial coefficients, the at least one changed value is checked for consistency with the value of at least one recovered transform coefficient. In some preferred embodiments of the present invention, the check is performed by transforming the "adjusted" set of partial coefficients using the partial transform that transforms the set of partial coefficients into the set of transform coefficients (i.e. the inverse of the partial transform that transforms the set of transform coefficients into the set of partial coefficients). At least one value of the transformed set of adjusted partial coefficients is then compared with at least one transform coefficient using an appropriate metric to determine if the set of adjusted partial coefficients are consistent with the transform coefficients.

In some preferred embodiments of the present invention, if the value of at least one partial coefficient is changed in a first set of partial coefficients, the at least one changed value is checked for consistency with the value of at least one partial coefficient in a second set of partial coefficients. In some preferred embodiments of the present invention, the check is performed by transforming the adjusted first set of partial coefficients using the partial transform or partial inverse transform that transforms the first set of partial coefficients into the second set of partial coefficients. The transformed set of adjusted first partial coefficients is then compared with the second set of partial coefficients using an appropriate metric to determine if the first and second sets of partial coefficients are consistent.

In some preferred embodiments of the present invention an adjustment range for a partial coefficient is determined responsive to values of other partial coefficients in the same set of partial coefficients.

In some preferred embodiments of the present invention an adjustment range for a partial coefficient is determined responsive to the magnitude of the quantizers used to quantize transform coefficients.

In some preferred embodiments of the present invention the value of at least one recovered transform coefficient is adjusted using an adjustment algorithm prior to operating on the transform coefficients with a partial transform. In some preferred embodiments of the present invention the at least one recovered transform coefficient is adjusted according to an algorithm responsive to the value of the transform coefficient's quantizer. In some preferred embodiments of the present invention, the at least one recovered transform coefficient is adjusted according to an algorithm responsive to the value of a recovered transform coefficient or the value of partial coefficient.

According to an adjustment algorithm used in some preferred embodiments of the present invention, the value of the at least one transform coefficient is adjusted to conform to a predetermined pattern relating values of transform coefficients.

For compressed data representing color images, in some preferred embodiments of the present invention, the value of at least one transform coefficient for one color component is adjusted responsive to at least one value of a transform coefficient for a different color component.

Generally, as in the case of partial coefficients, recovered coefficients generated from a first set of compressed data may be adjusted, in accordance with a preferred embodiment of the present invention, responsive to recovered coefficients of a second set of compressed data.

Using an algorithm to adjust the value of at least one transform coefficient does not necessarily change the value of the at least one transform coefficient. In some cases the result of using the algorithm is to leave the value of the at least one transform coefficient unchanged.

The inventors have found that for JPEG compressed images, or images compressed using derivative and similar compression techniques, adjusting partial coefficients in accordance with a preferred embodiment of the present invention, reduces noise in the recovered image to a greater extent than it decreases contributions to the recovered image from high spatial frequency transform coefficients. Therefore, the quality of the recovered image is enhanced as a result of noise reduction but with less loss of sharpness than usually results from noise reduction techniques used in image processing. Furthermore, in accordance with a preferred embodiment of the present invention, partial coefficients are adjusted as described above. An image recovered using the adjusted partial coefficients is then enhanced with a sharpness enhancing procedure, in accordance with some embodiments of the invention. The resulting recovered image, in accordance with a preferred embodiment of the present invention, is enhanced by both noise reduction and edge enhancement.

There is therefore provided in accordance with a preferred embodiment of the present invention a method for recovering an image defined as a function of image coordinates of an image space from compressed data that is a function of transform coordinates in a transform space comprising: a) transforming the compressed data using at least one partial transform to generate a set of intermediate coefficients in a space intermediate between the transform space and the image space; b) adjusting the value of at least one intermediate coefficient and using the adjusted value to generate a set of adjusted intermediate coefficients; and c) recovering the image by transforming the set of adjusted intermediate coefficients to the image space with at least one additional partial transform.

Preferably, adjusting the value of at least one partial coefficient comprises: a) determining an adjustment range; b) determining a value in the adjustment range; and c) setting the value of the intermediate coefficient equal to the determined value.

Preferably, the compressed data comprises information for determining a set of quantized values and a quantizer for each quantized value as functions of coordinates of the transform space, and transforming the data comprises determining a first set of coefficients in the transform space using the quantizers and the quantized values and transforming the first set of coefficients with the at least one partial transform.

Determining the first set of coefficients preferably comprises determining the product of each quantized value with its quantizer and determining the first set of coefficients as a set comprising all the products. Alternatively, determining the first set of coefficients preferably comprises determining the product of each quantized value with its quantizer, adjusting the value of at least one of the products and determining the first set of coefficients as a set comprising all the products.

In some preferred embodiments of the present invention, determining an adjustment range comprises determining at least one adjustment limit and determining the adjustment range responsive to the adjustment limit.

Preferably, determining at least one adjustment limit comprises transforming the set of quantizers with the at least one transform to generate a set of transformed quantizers in the intermediate space and determining an adjustment limit for at least one intermediate coefficient responsive to at least one transformed quantizer of the set of transformed quantizers.

Preferably, determining at least one adjustment limit comprises adjusting the value of at least one quantizer responsive to values of the first coefficients prior to transforming the set of quantizers. Adjusting the value of at least one quantizer preferably comprises determining whether all of the first set of coefficients are zero for a value of a single coordinate of the transform space greater than a certain value and constant values for all other transform space coordinates and if so, setting the values of the quantizers corresponding to the zero coefficients equal to a same value. Preferably, the same value is equal to the maximum of the coefficients for all values of the single coordinate and the constant values for all other coordinates.

Additionally or alternatively, the at least one adjustment limit for the at least one intermediate coefficient is preferably determined responsive to the transformed quantizer having the same coordinates in the intermediate space as the at least one intermediate coefficient. Preferably, the adjustment limit is equal to the corresponding transformed quantizer multiplied by a fraction less than one. Preferably, the fraction is equal to 0.5.

In some preferred embodiments of the present invention, determining at least one adjustment limit comprises determining an adjustment limit for at least one intermediate coefficient responsive to the value of at least one of the intermediate coefficients.

Preferably, determining the at least one adjustment limit comprises determining the difference between a maximum and minimum intermediate coefficient in a plurality of intermediate coefficients in the set of intermediate coefficients and determining the adjustment limit responsive to the difference. Preferably, the plurality of intermediate coefficients comprises intermediate coefficients in a neighborhood of the at least one intermediate coefficient.

Alternatively and preferably, all but one of the coordinates of any two of the plurality of intermediate coefficients are the same and the plurality of intermediate coefficients includes the at least one intermediate coefficient.

Alternatively or additionally the adjustment limit is preferably equal to the difference multiplied by a fraction less than one. Preferably, the fraction is equal to 0.5.

Some preferred embodiments of the present invention comprise testing the set of adjusted intermediate coefficients for consistency with the first set of coefficients in the transform space.

Preferably, testing the set of adjusted intermediate coefficients comprises transforming the set of adjusted intermediate coefficients into a second set of coefficients in the transform space and comparing coefficients of the first set with coefficients of the second set to determine if the set of adjusted coefficients is consistent with the first set of coefficients. Preferably, comparing coefficients comprises determining how close the value of at least one coefficient of the first set is to the value of at least one coefficient of the second set. Determining how close the value of at least one coefficient of the first set is to the value of at least one coefficient of the second set preferably comprises using a metric.

In some preferred embodiments of the present invention, if the set of intermediate coefficients is not consistent with the first set of coefficients, the value at least one adjusted intermediate coefficient of the set of adjusted intermediate coefficients is readjusted to generate a readjusted set of intermediate coefficients so that the set of readjusted intermediate coefficients is consistent with the first set of coefficients.

In some preferred embodiments of the present invention adjusting the at least one intermediate coefficient comprises adjusting the at least one intermediate coefficient responsive to coefficients in a neighborhood of the at least one intermediate coefficient. Preferably, the neighborhood comprises a plurality of intermediate coefficients, including the at least one intermediate coefficient, for which any two intermediate coefficients have same values for all the same coordinates except one.

In some preferred embodiments of the present invention, adjusting the at least one intermediate coefficient comprises adjusting the at least one intermediate coefficient responsive to a ratio between a partial coefficient and a function of other partial coefficients.

In some preferred embodiments of the present invention, adjusting the at least one intermediate coefficient comprises adjusting the at least one partial coefficient responsive to a trend in changes of values of partial coefficients as a function of changes in at least one coordinate of the intermediate space.

In some preferred embodiments of the present invention, adjusting the at least one intermediate coefficient comprises adjusting the at least one partial coefficient responsive to an expected trend in changes of values of partial coefficients as a function of changes in at least one coordinate of the intermediate space.

In some preferred embodiments of the present invention, adjusting the at least one intermediate coefficient comprises adjusting the at least one partial coefficient responsive to a predetermined template. Preferably, the template identifies an edge in the recovered image and comprising smoothing the recovered image on either side of the identified edge.

In some preferred embodiments of the present invention, adjusting the value of the at least one intermediate coefficient comprises adjusting the value of the at least one intermediate coefficient responsive to data from different compressed data that is related to the compressed data. Preferably, the image in the image space comprises values for a first color component of a color image in the image space and the different compressed data comprises data for generating a second color component image of the color image. Additionally or alternatively, the different compressed data identify an edge in the recovered image. Some preferred embodiments of the present invention in which an edge is identified comprise smoothing the image on either side of the edge.

Some preferred embodiments of the present invention comprise testing the set of adjusted intermediate coefficients for consistency with a first set of intermediate coefficients defined in an intermediate space different from the intermediate space in which the adjusted intermediate coefficients are defined.

Preferably, testing the set of adjusted intermediate coefficients comprises transforming the set of adjusted intermediate coefficients into a second set of intermediate coefficients in the different intermediate space and comparing intermediate coefficients of the first set with intermediate coefficients of the second set to determine if the set of adjusted coefficients is consistent with the first set of intermediate coefficients.

Preferably, comparing coefficients comprises determining how close the value of at least one intermediate coefficient of the first set is to the value of at least one intermediate coefficient of the second set. Determining how close the value of at least one intermediate coefficient of the first set is to the value of at least one intermediate coefficient of the second set preferably comprises using a metric.

If the set of adjusted intermediate coefficients is not consistent with the first set of intermediate coefficients, in some preferred embodiments of the present invention, the value at least one adjusted intermediate coefficient of the set of adjusted intermediate coefficients is readjusted to generate a readjusted set of intermediate coefficients so that the set of readjusted intermediate coefficients is consistent with the first set of intermediate coefficients.

There is further provided, in accordance with a preferred embodiment of the present invention, a method for recovering an image defined as a function of image coordinates in an image space from compressed data that is a function of transform coordinates in a transform space the method comprising: a) using the data to generate a first set of recovered transform coefficients in the transform space; b) determining an adjustment range for at least one recovered transform coefficient; c) replacing the at least one recovered transform coefficient by a value in the adjustment range responsive to recovered transform coefficients in a neighborhood comprising less than all of the recovered transform coefficients of the at least one recovered transform coefficient, to generate an adjusted set of recovered transform coefficients; and d) recovering the image by transforming the adjusted set of recovered transform coefficients to the image space.

Preferably, the neighborhood comprises a plurality of recovered transform coefficients including the at least one recovered coefficient, for which any two recovered coefficients have same values for all the same coordinates except one.

There is further provided, in accordance with a preferred embodiment of the present invention, a method for recovering an image defined in an image space from compressed data that comprises quantized values and a quantizer for each quantized value that are functions of transform coordinates in a transform space the method comprising: a) determining a set of recovered transform coefficients in which each recovered transform coefficient is a product of a quantized value with its quantizer; b) determining an adjustment range having an upper and lower limit for at least one recovered transform coefficient of the first set of recovered coefficients, wherein the difference between the upper and lower limit is less than the magnitude of the quantizer used to determine the at least one recovered coefficient; c) replacing the at least one recovered transform coefficient by a value in the adjustment range to generate an adjusted set of recovered transform coefficients; and d) recovering the image by transforming the adjusted set of recovered transform coefficients to the image space.

There is further provided, in accordance with a preferred embodiment of the present invention, a method for recovering an image defined in an image space from a first set of compressed data that comprises quantized values and a quantizer for each quantized value that are functions of transform coordinates in a transform space the method comprising: a) determining a first set of recovered transform coefficients in which each recovered transform coefficient is a product of a quantized value with its quantizer; b) determining an adjustment range for at least one recovered coefficient; c) replacing the at least one transform coefficient with a value in the adjustment range responsive to recovered transform coefficients generated using a second set of related compressed data to generate an adjusted set of recovered transform coefficients; and d) recovering the image by transforming the adjusted set of recovered transform coefficients to the image space. Preferably, the first and second sets of compressed data are generated from different color component images of a color image.

There is further provided, in accordance with a preferred embodiment of the present invention, a method for adjusting an image having a plurality of image values defined in an image space, the image values being generated from compressed data comprising quantized values and a quantizer for each quantized value that are functions of transform coordinates in a transform space the method comprising: determining an adjustment range for at least one image value of the plurality of image values responsive to the quantizers; determining a value in the adjustment range; adjusting the image by replacing the at least one image value with the determined value.

Preferably, determining an adjustment range comprises determining an average of a plurality of the quantizers. Alternatively, determining an adjustment range preferably comprises determining a maximum quantizer in a plurality of the quantizers. Alternatively, determining an adjustment range preferably comprises determining a minimum quantizer in a plurality of the quantizers.

In some preferred embodiments of the present invention, the plurality of the quantizers comprises all quantizers in the compressed data.

In some preferred embodiments of the present invention, determining a value comprises determining a value responsive to image values of a different related image. Preferably, the image and the different related image are color component images of a multicolor color image.

Some preferred embodiments of the present invention, comprise smoothing the recovered image.

In some preferred embodiments of the present invention, the image is an image defined in a three dimensional image space.

In some preferred embodiments of the present invention, the image is an image defined in a two dimensional space.

The compressed data in some preferred embodiments of the present invention is data generated using a unitary separable transform to transform an image in the image space into a set of values in the transform space.

In some preferred embodiments of the present invention, the compressed data is generated using a JPEG compression method.

In some preferred embodiments of the present invention, the compressed data is generated using an MPEG compression method.

In some preferred embodiments of the present invention, the compressed data is generated using a PX64 compression method.

In some preferred embodiments of the present invention, the compressed data is generated using an H261 compression method.

In some preferred embodiments of the present invention, the compressed data is generated using an H263 compression method.

In some preferred embodiments of the present invention, the compressed data is generated using an H323 compression method.

In some preferred embodiments of the present invention, the compressed data is generated using an HDTV compression method.

The invention will be more clearly understood by reference to the following description of preferred embodiments thereof read in conjunction with the figures attached hereto.

DETAILED DESCRIPTION OF PREFERRED EMBODIMENTS

Figure 1A:
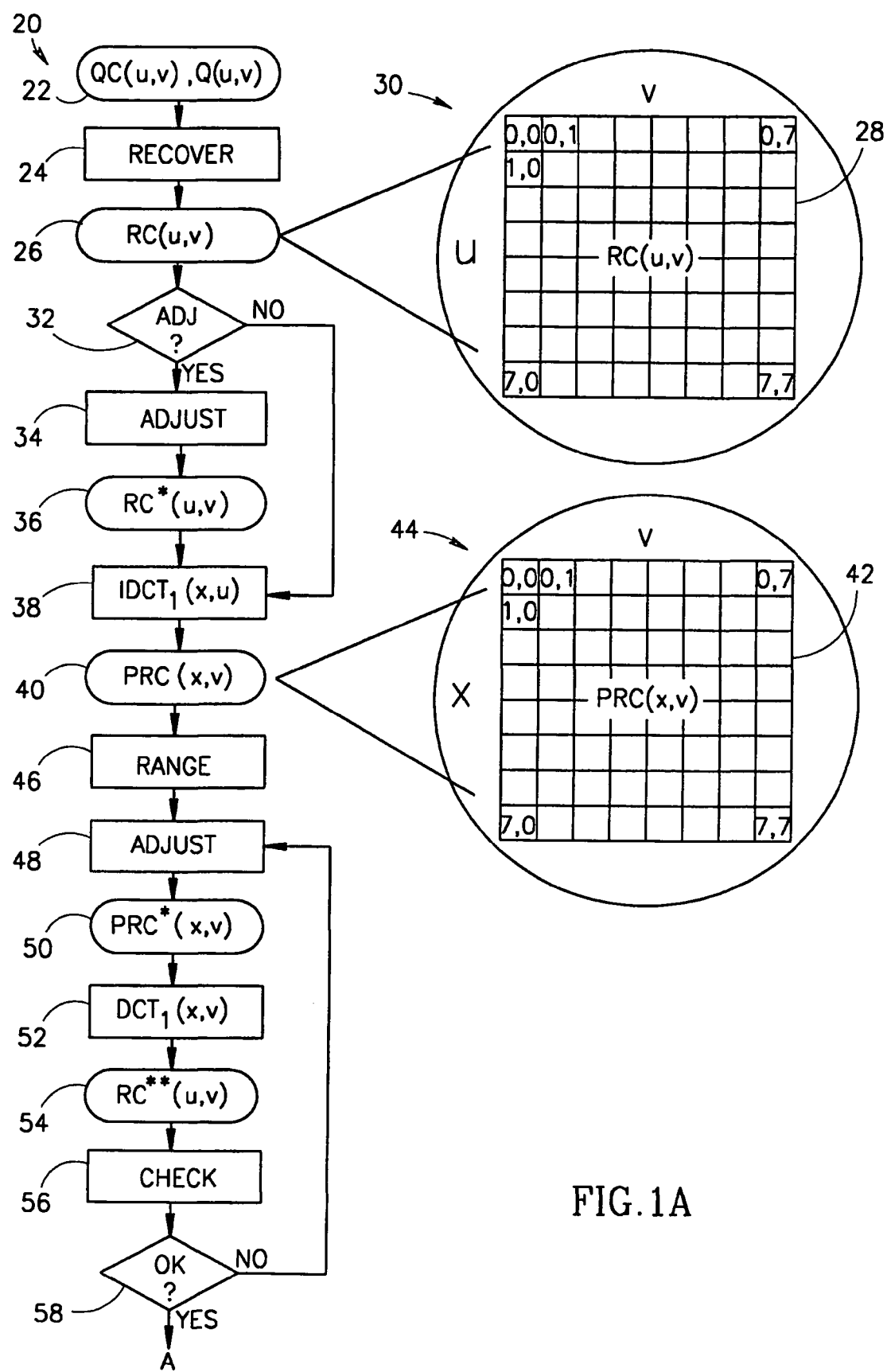
FIGS. 1A-1B show a flow diagram schematically illustrating a procedure for recovering an image from two dimensional data compressed data, such as JPEG and MPEG compressed data, compressed using a two dimensional discrete cosine transform, in accordance with a preferred embodiment of the present invention.
Figure 1B:
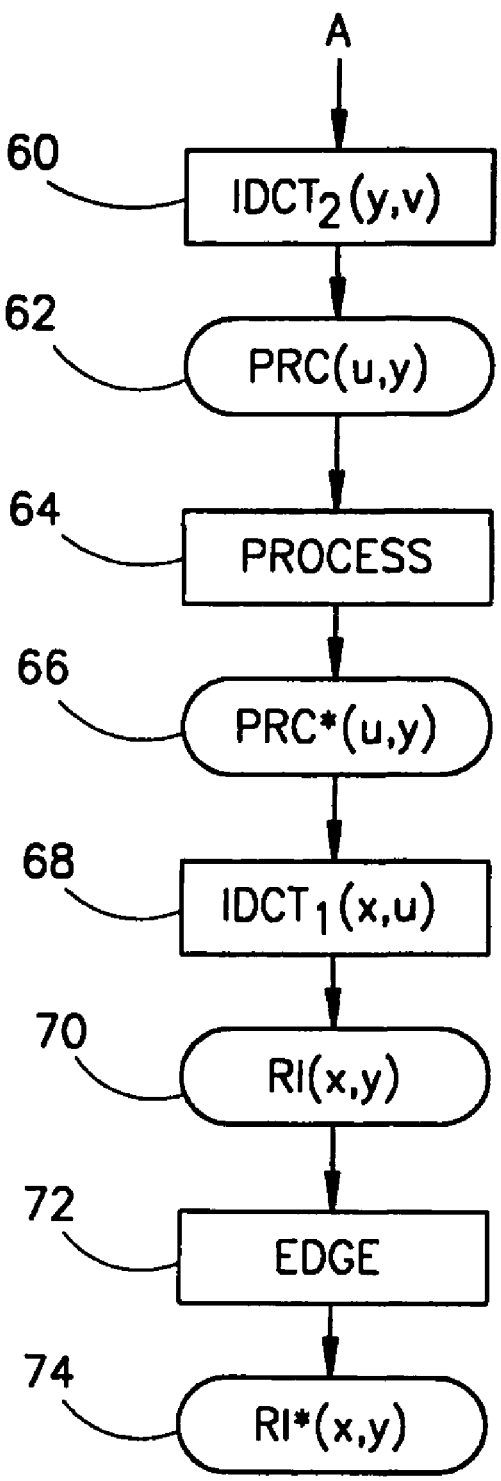

FIGS. 1A and 1B show a flow diagram of a procedure 20 for recovering an image from two dimensional compressed data 22 (shown in FIG. 1A). Data 22 represents compressed data that is compressed from a two dimensional image defined in an image space using any of many different suitable transforms and quantization procedures. However, for clarity and efficacy of exposition it is assumed that data 22 represents data for a color image compressed using a JPEG compression procedure.

Assume, for example, that compressed data 22 represents luminance values of pixels in an 8 pixel by 8 pixel tile, of a plurality of pixel tiles into which a color image is partitioned. Compressed data 22 therefore comprises information sufficient to determine values for sixty four quantized transform coefficients $QC(u,v)$ and a quantizer $Q(u,v)$ for each $QC(u,v)$. It should be noted that $Q(u,v)$ is not generally a constant and is often a function of u and v.

Each quantized transform $QC(u,v)$ is generated from a corresponding transform coefficient $C(u,v)$ by quantizing transform coefficient $C(u,v)$ using quantizer $Q(u,v)$. The $C(u,v)$ are generated in JPEG by transforming the luminance values of the pixels in the tile with the discrete cosine transform. If I(x,y) represents the luminance of the pixel in the x-th row and y-th column of the tile then $$C(u, v) = \sum_{x=0}^{7}\sum_{y=0}^{7} DCT(u, v, x, y)I(x, y),$$

where DCT(u,v,x,y) represent the two dimensional discrete cosine transform. However since DCT(u,v,x,y) is separable, the equation for C(u,v) can be written $$C(u, v) = \sum_{x=0}^{7}\sum_{y=0}^{7} DCT_1(u, x)DCT_2(v, y)I(x, y),$$

where $DCT_1$ (u,x) and $DCT_2$(v,y) are partial transforms that convert image space coordinates, x and y, hereinafter referred to as spatial coordinates, into transform space coordinates u and v respectively. The inverse discrete cosine transform IDCT(x,y,u,v), can similarly be written as $IDCT_2$(y,v)$IDCT_1$(x,u).

Procedure 20 begins processing compressed data 22 in a step 24 in which compressed data 22 is used to generate a data set 26 of recovered transform coefficients RC(u,v). It is often convenient to visualize data set 26 as a matrix of elements whose values are the magnitudes of the RC(u,v), where u is the row and v is the column of the matrix in which the value of RC(u,v) is located. Following common convention the element in the upper left corner of the matrix is the magnitude of RC(0,0). Data sets comprising the QC(u, v), Q(u,v) and other related data sets are similarly conveniently visualized. An RC(u,v) matrix 28 is schematically shown in inset 30 of FIG. 2

In step 32 a decision is made whether or not to adjust the recovered transform coefficients RC(u,v). In some preferred embodiments of the present invention the decision to adjust or not to adjust is made responsive to values of RC(u,v) and/or values of Q(u,v). For example in accordance with a preferred embodiment of the present invention only values of RC(u,v) that are equal to ±1 are adjusted, since relative errors due to quantization in these recovered coefficients are generally greater than relative errors in higher valued recovered coefficients.

If procedure 20 does adjust recovered transform coefficients RC(u,v), procedure 20 advances to step 34 in which the value of at least one recovered transform coefficient RC(u,v) is adjusted using at least one adjustment algorithm.

According to one adjustment algorithm, in accordance with a preferred embodiment of the present invention, the value of RC(u,v) is set equal to [QC(u,v)Q(u,v)−Q(u,v)(u+v)/32] instead of QC(u,v)Q(u,v). A recovered transform coefficient RC(u,v) can differ from the transform coefficient C(u,v) from which it was quantized by an amount that can vary up to a maximum amount, hereinafter referred to as a "quantization error", that is one half the magnitude of the quantizer used to quantize C(u,v). Therefore, the effect of this algorithm is to bias the value of a recovered transform coefficient RC(u,v) to lower values of a range of possible values for the transform coefficient C(u,v) from which QC(u,v) was generated by an amount equal to a fraction of its quantization error. Furthermore the bias is larger for higher spatial frequency recovered transform coefficients than for lower spatial frequency recovered transform coefficients (i.e. for C(u,v) with larger values for u+v). In a variation of this algorithm, RC(u,v) is set equal to [QC(u,v)Q(u,v)−αQ(u,v)], where α is a fraction less than one. According to this algorithm for adjusting recovered transform coefficients, each recovered transform coefficient is reduced by the same fraction of its quantization error. Preferably α is greater than 0.5. More preferably, α is equal to 0.75.

Generally, the magnitudes of cosine transform coefficients of an image decrease substantially monotonically with increasing spatial frequency, especially for relatively small homogeneous images. If recovered transform coefficients RC(u,v) do not exhibit this expected behavior they are adjusted to reduce deviation from the expected behavior using another adjustment algorithm in accordance with a preferred embodiment of the present invention. In accordance with a preferred embodiment of the present invention, RC(u,v) are increased or decreased by amounts up to their quantization errors, so that to an extent possible, for a constant value for one of the arguments u or v, the absolute values of RC(u,v), or alternatively the values of RC(u,v), monotonically decrease with increase in the other argument. In some preferred embodiments of the present invention RC(u,v) that are equal to zero are not included in the adjustment procedure.

For example, a straight line can be fitted by regression to the RC(u,v) in a row. If the regression line has a negative slope, individual RC(x,v) are adjusted within their quantization errors so that they are as close as possible to the regression line. If the regression line does not have a negative slope, values of RC(x,v) are not adjusted. Alternatively, for example, if the regression line does not have a negative slope, a regression line with a negative slope can be searched for using a subset of the RC(x,v). If a suitable regression line is found then values of the RC(x,v) in the subset are adjusted to exhibit monotonically decreasing values. For example, a regression curve can be fitted only for those RC(x,v) having spatial frequencies greater than the spatial frequency of the maximum RC(x,v) in the row. Other ways of defining a negative slope for adjusting the R(x,v) will occur to persons of the art.

The decrease in magnitude of transform coefficients with increasing spatial frequency is a characteristic common to many transforms. The transform coefficients can be considered projections of an image on basis functions of the transform. The basis functions exhibit different rates of spatial variation and can be arranged in an ordered set in which each basis function in the set exhibits a higher rate, i.e. frequency, of spatial variation than the basis function that precedes it in the ordered set. The first basis function, often called the DC function, is a constant and its corresponding transform coefficient is an average of the image over a spatial range in which the image is defined. At some basis function spatial frequency, the frequency of variation of a basis function is generally larger than a dominant rate of change in the image. From that spatial frequency on, the magnitudes of the transform coefficients are generally monotonically decreasing with increasing spatial frequency. For relatively homogeneous images (the tiles in a JPEG image are generally small enough so that they are substantially homogeneous) the transform coefficients are substantially monotonically decreasing from the DC transform coefficient on.

The application of an adjustment algorithm to data set 26 of recovered transform coefficients RC(u,v) generates a data set 36 of adjusted recovered transform coefficients RC*(u, v). Procedure 20 then advances to a step 38 in which data set 36 is transformed by one of the partial inverse discrete cosine transforms, $IDCT_1(x,u)$ or $IDCT_2(y,v)$, into a data set 40 of partial coefficients $PRC(x,v)$ or $PRC(u,y)$. For clarity and economy of presentation it is assumed that in step 38, data set 36 comprising $RC^*(u,v)$ is transformed using $IDCT_1(x,u)$ so that data set 40 comprises partial coefficients $PRC(x,v)$.

If the decision in decision step 32 is not to adjust at least one recovered transform coefficient $RC(u,v)$ then procedure 20 advances directly from decision step 32 to step 38 and partial transform $IDCT_1(x,u)$ transforms data set 26 into data set 40 instead of transforming data set 36 into data set 40.

Transforming data set 40 of partial coefficients $PRC(x,v)$ with partial transform $DCT_1(u,x)$ regenerates the $RC(u,v)$, or the $RC^*(u,v)$, from which the $PRC(x,v)$ are generated.

A visualization of $PRC(x,v)$ data set 40 as a matrix 42 is schematically shown in inset 44 of FIG. 1. The spatial coordinate x indicates the row and the transform coordinate v indicates the column of matrix 42 in which an element $PRC(x,v)$ is located. $PRC(0,0)$ is in the upper left corner of matrix 42. If recovered transform coefficients $RC(u,v)$ were equal to transform coefficients $C(u,v)$, i.e. if there is no error or information loss in compressed data 26, and no $RC(u,v)$ is adjusted, then the $PRC(x,v)$ in a row "X" would be the cosine transform of $I(x,y)$ for $x=X$ along the y-axis. Increasing column number v corresponds to increasing spatial frequency along the y-axis of $I(x,y)$.

Following generation of data set 40 of partial coefficients $PRC(x,v)$, in step 46, an adjustment range is preferably determined for at least one $PRC(x,v)$. An adjustment range for a $PRC(x,v)$ can be determined in different ways, in accordance with various preferred embodiments of the present invention.

Assume $PRC(x,v)$ has an adjustment limit, $ALIM(x,v)$. An adjustment algorithm, in accordance with a preferred embodiment of the present invention, adjusts $PRC(x,v)$ by assigning $PRC(x,v)$ a value in an adjustment range of values defined by $PRC(x,v) \pm ALIM(x,v)$. Whereas the noted defined range of values is symmetric, it is possible, and may be advantageous, in accordance with a preferred embodiment of the present invention, to define a range that is asymmetric about $PRC(x,v)$. Furthermore, it should be noted that adjustment limits and adjustment ranges can be computed in different ways and have different values for different adjustment algorithms.

In accordance with a preferred embodiment of the present invention adjustment limits for $PRC(x,v)$ are determined by transforming the quantizers $Q(u,v)$ of compressed data 22 with $IDCT_1(x,u)$ to generate a set of partial quantizers $PQ(x,v)$. $ALIM(x,v)$ is then preferably set equal to $\alpha(x,v) PQ(x,v)$, where $\alpha(x,v)$ is preferably a fraction less than or equal to one half More preferably $\alpha$ is set equal to one half.

In some preferred embodiments of the present invention the $Q(u,v)$ are adjusted to provide a set of adjusted quantizers $Q^*(u,v)$ that are used instead of $Q(u,v)$ to calculate the $ALIM(x,v)$. The $Q^*(u,v)$ are not used to calculate recovered coefficients $RC(u,v)$ only the values for adjustment ranges.

In some preferred embodiments of the present invention, adjustments to $Q(u,v)$ are made responsive to values of quantized transform coefficients $QC(u,v)$ in compressed data 22. For example, assume that quantized transform coefficients $QC(u,v)$ are equal to zero for $v>V$ in a row $u=U$. Assume that the maximum value for the $QC(u,v)$ in row U occurs in column W, so that the maximum quantized transform coefficient in row U is $QC(U,W)$. Then, in accordance with a preferred embodiment of the present invention, the quantizers $Q(u,v)$ for $u=U$ and $v>V$ are set equal to $QC(U, W)$ to generate an adjusted set of quantizers $Q^*(u,v)$ with which to determine adjustment limits $ALIM(x,v)$. Since it is expected that $QC(u,v)$ decrease monotonically with v it is reasonable to limit an adjustment limit for the $QC(U,v)$ that are zero to the value of the largest non-zero $QC(U,v)$.

Adjustment limits $ALIM(x,v)$ can also be determined responsive to values of partial coefficients $PRC(x,v)$, in accordance with a preferred embodiment of the present invention. For example, an adjustment limit $ALIM(x,v)$ for $x=X$ and $v=V$ can be determined to be equal to a fraction less than one of the difference between a maximum and a minimum partial coefficient $PRC(x,v)$ in row X or column V or a surround of "location" X,V. Preferably the fraction is greater than or equal to 0.5. More preferably the fraction is equal to 0.5. Other methods for determining adjustment limits $ALIM(x,v)$ will occur to persons of the art.

In yet other preferred embodiments of the present invention $ALIM(x,v)$ is determined to be equal to a product of a fraction less than one times the minimum $PRC(x,v)$ in either row x or column v.

Following determination of an adjustment limit $ALIM(x,v)$ and an adjustment range in step 46 for at least one $PRC(x,v)$, the at least one $PRC(x,v)$ is then adjusted, in a step 48, using at least one appropriate adjustment algorithm. The adjustment algorithm is used to determine a new value for each of the at least one $PRC(x,v)$, which new value lies within the adjustment range of the $PRC(x,v)$ determined from the adjustment limit $ALIM(x,v)$. The value of the $PRC(x,v)$ is then set equal to the new value. The result of adjusting the at least one $PRC(x,v)$ is generation of an adjusted data set 50 of partial transform coefficients $PRC^*(x,v)$.

Whereas the at least one adjustment algorithm is described as used subject to the constraint of an adjustment limit, it is possible, in accordance with a preferred embodiment of the present invention, to use algorithms that are not constrained by an adjustment limit.

It should be noted that a new value for a $PRC(x,v)$ determined by an algorithm can be equal to an "old" value of the $PRC(x,v)$ and that therefore in some circumstances, in accordance with a preferred embodiment of the present invention, some or all values in data set 50 of adjusted transform coefficients $PRC^*(x,v)$ are identical to corresponding values of data set 40 of transform coefficients $PRC(x,v)$.

According to one adjustment algorithm, in accordance with a preferred embodiment of the present invention, $PRC(x,v)$ in at least one row (i.e. constant x) are increased or decreased by amounts limited by at least one adjustment limit so that to an extent possible the values $PRC(x,v)$ decrease monotonically with increasing column number (i.e. increasing v). This can be achieved, for example, using a regression line determination and fitting technique similar to the one described above for adjusting recovered transform coefficients $RC(u,v)$ so that the values of the recovered transform coefficients decrease substantially monotonically with increasing column or row number.

According to another adjustment algorithm, in accordance with a preferred embodiment of the present invention, $PRC(x,v)$ in at least one row are adjusted to moderate an anomalous value of a $PRC(x,v)$ in the row. In some preferred embodiments of the present invention the value of the $PRC(x,v)$ is tested for anomaly by determining an average of values of $PRC(x,v)$ in the row and comparing the value of the $PRC(x,v)$ with the average. For example, if AV represents the determined average and $ALIM(x,v)$ represents a symmetric adjustment limit for the PRC(x,v) (i.e. PRC(x,v) is adjustable in a range PRC(x,v)±ALIM(x,v)), then if |(PRC(x,v) −AV)|≧ALIM(x,v) the value of the PRC(x,v) is considered anomalous. In some preferred embodiments of the present invention when a PRC(x,v) is anomalous, a low pass filter is applied to the PRC(x,v) and adjacent PRC(x,v) in the row in order to moderate the anomaly. In some preferred embodiments of the present invention, the value of an anomalous PRC(x,v) is multiplied by an appropriate factor less than one to reduce the anomaly. In some preferred embodiments of the present invention an average AV is calculated according to $$AV = (1/2M) * \sum_{m=1}^{M} [PRC(x, v-m) + PRC(x, v+m)].$$

In some preferred embodiments of the present invention anomalies that are moderated are anomalies that are identified in a value of a first PRC(x,v) by comparing the value of the first PRC(x,v) with values of other PRC(x,v) that are in the same column as the first PRC(x,v). In some preferred embodiments of the present invention the value of a first PRC(x,v) is compared to values of other PRC(x,v) in an area of the matrix surrounding the first PRC(x,v) to determine if the value of the first PRC(x,v) is anomalous.

According to another adjustment algorithm, in accordance with a preferred embodiment of the present invention, the value of a particular PRC(x,v) is adjusted responsive to a ratio between other PRC(x,v). For example, generally values of PRC(x,v) for column numbers greater than 2 are less reliable than values of PRC(x,v) for column numbers less than or equal to two. This occurs, generally, because higher spatial frequency transform coefficients C(u,v) are generally smaller than lower frequency transform coefficients C(u,v) and because the higher frequency transform coefficients are usually quantized with larger quantizers than lower spatial frequency transform coefficients C(u,v). Accordingly, in some preferred embodiments of the present invention, PRC (x,v) in higher number columns are adjusted in response to a ratio between a higher column number PRC(x,v) and a value that is determined form lower column number PRC (x,v).

For example, assume that PRC(x,v) for a column v=V are to be adjusted and that V≧3. According to a preferred embodiment of the present invention a row X is determined for which the value PRC(x,V) is a maximum. A value "VAL(X)" is set equal to the average of, PRC(X,0) and PRC(X,1) in row X, and an adjustment ratio AR=PRC(X, V)/VAL(X) is calculated. The value of at least one other PRC(x,V) in column V is then adjusted by replacing it with a new value "NPRC(x,V)" that satisfies the relation[PRC(x, V)−ALIM(x,V)]≦NPRC(x,V)≦[PRC(x,V)+ALIM(x,V)] and minimizes [NPRC(x,V)−VAL(x)AR]. In these relations VAL(x) is the average of PRC(x,0) and PRC(x,1) and ALIM(x,V) is the adjustment limit of PRC(x,V).

According to another adjustment algorithm, in accordance with a preferred embodiment of the present invention, PRC(x,v) in a same row X are set to zero if the value PRC(X,v) satisfies the relation: ALIM(X,v)≦PRC(X,v)≦+ALIM(X,v) for all v. In some preferred embodiments of the present invention, if the above relation is satisfied by all but one or two of the PRC(X,v) then a low pass filter is applied to PRC(X,v) to moderate variations in PRC(X,v).

According to other adjustment algorithms, in accordance with preferred embodiments of the present invention, a partial coefficient or a transform coefficient for one color component image of a color image is adjusted in response to at least one transform coefficient or partial coefficient of a different color component image of the color image.

For example in JPEG, chrominance components U and V are often coded for every other pixel of a color image while luminance Y is coded for every pixel, i.e. Y is sampled at twice the rate as U and V in the color image. Typically, for an 8 by 8 tile of pixels in the color image, Y will have 64 values while U and V will each have only sixteen values. As a result, luminance Y will be specified by sixty-four recovered transform coefficients for the tile while U and V will each be specified by sixteen recovered transform coefficients for the same tile. Each row or column of recovered luminance transform coefficients Y comprises eight coefficients while each row or column of recovered chrominance transform coefficients, U or V, comprises only four coefficients. Recovered Y transform coefficients for the tile will therefore comprise sixty four recovered coefficients and recovered U and V transform coefficients will comprise 16 recovered coefficients. Using an adjustment algorithm, in accordance with a preferred embodiment of the present invention, the four recovered transform coefficients for a chrominance component are extrapolated to eight transform coefficients, responsive to values of the chrominance coefficients and values of the luminance coefficients. Extrapolating the four chrominance coefficients to eight chrominance coefficients provides an estimate of chrominance coefficients that might result from a finer sampling of the chrominance component of the image.

In accordance with some preferred embodiments of the present invention, recovered U coefficients (or, of course, recovered V coefficients or both recovered U and V coefficients) are extrapolated to eight recovered U coefficients that have values that reflect a trend in the values of the Y coefficients. For example, assume that a row of Y recovered coefficients for a tile of a color image have values 100, 60, 30, 30, 20, 10, 0, 0 and that corresponding U recovered coefficients for the tile have values 60, 40, 10, 0. Then an extrapolated set of eight recovered U coefficients, in accordance with a preferred embodiment of the present invention might have values 70, 50, 40, 40, 15, 5, 0, 0.

In accordance with some preferred embodiments of the present invention an edge that is well defined by data for one color component image of a color image is used to locate an edge in recovered coefficients and/or partial coefficients or in a recovered image of another color component image of the color image. Once the edged is located, in some preferred embodiments of the present invention the recovered coefficients and/or the partial coefficients and/or the recovered image are smoothed on either side of the located edge. This preserves the edge and thereby sharpness of the recovered image while reducing noise in the recovered image.

Whereas the above example is given for recovered transform coefficients, the example applies equally well to adjusting a partial transform coefficient for one color component using recovered partial coefficients or transform coefficients for a different color component.

Furthermore, adjusting recovered coefficients and/or partial coefficients for one set of compressed data responsive to recovered coefficients and/or partial coefficients in a related set of compressed data is not limited to color component images of color images, in accordance with a preferred embodiment of the present invention. Quite generally, recovered coefficients and or partial coefficients generated from a first set of compressed data may be adjusted, in accordance with a preferred embodiment of the present invention, responsive to recovered coefficients and/or partial coefficients of a related second set of compressed data.

According to other adjustment algorithms, in accordance with preferred embodiments of the present invention, the value of at least one partial coefficient is adjusted to conform to a predetermined pattern, hereinafter referred to as a "template", that defines relationships between a set of partial coefficients.

A template comprises a set of values and a variance for each value, hereinafter referred to respectively as a "template" value and a "template" variance. Each template value and its template variance defines a range of values for a different partial coefficient of a set of partial coefficients. The template values are compared, in accordance with a preferred embodiment of the present invention, to the set of partial coefficients using a metric responsive to template variance and adjustment limit of the partial coefficients. The comparison is used to determine to what degree relationships between the template values and relationships between the partial coefficients are similar. If, according to the metric, the template and the set of partial coefficients are considered to match, i.e. relationships between the template values and relationships between the partial coefficients are sufficiently similar, then the partial coefficients are adjusted to improve the match.

For example, a template for row x=X of JPEG partial coefficients i.e. PRC(X,v), might comprise eight template values and variances that are functions of column number v. For the row, let the template values be represented by T(X,v) and the template variances be represented by TALIM(X,v). Then, in accordance with a preferred embodiment of the present invention, a suitable "matching" metric to determine the degree to which the row of partial coefficients RC(X,v) and the template values T(X,v) match, is $$\text{"MATCH"} = \sum_v [PRC(X,v) - \alpha T(X,v)]^2 / [TALIM(X,v)^2 + ALIM(X,v)^2].$$

In the equation, $\alpha$ is a suitable scaling constant that best removes any constant factor between values of PRC(X,v) and T(X,v). If MATCH is less than an appropriate threshold, then the PRC(X,v) and the T(X,v) are considered a match. If there is a match then, in accordance with a preferred embodiment of the present invention, at least one value of the PRC(X,v) is adjusted within limits determined by its adjustment limit R(X,v) to minimize MATCH.

In accordance with some preferred embodiments of the present invention, a template matching algorithm is used to test a set of partial coefficients for a match with each of a plurality of different templates to determine which, if any, of the templates best matches the set of coefficients. In some preferred embodiments of the present invention the best matching template is chosen for use in adjusting the partial coefficients. For example, in the JPEG example, MATCH might be calculated for each of a plurality of different templates and the template that provides the smallest value for MATCH will be the template used to adjust at least one PRC(X,v).

In other preferred embodiments of the present invention, if more than one template is found to match a set of partial coefficients, as determined by a suitable matching metric, all of the matching templates are used to adjust at least one of the partial coefficients. Preferably, this is performed by forming a weighted average of the matching templates and using values of the weighted average to adjust at least one of the partial coefficients. For example, assume that "m" templates $T_i(X,v)$ are found to match the JPEG partial coefficients PRC(X,v). If a weighted average of the matching templates is represented by WT(X,v) then $$WT(X,v) = \sum_{i=0}^{m} \beta_i T_i(X,v)$$

where $\beta_i$ are appropriate weighting factors and each PRC(X,v) is preferably adjusted responsive to WT(X,v).

Preferably, in accordance with a preferred embodiment of the present invention, some of the templates that are tested for a match with a set of recovered transform coefficients are templates that correspond to possible edges in the image from which the compressed data is generated. When a match is found between a set of partial coefficients and a template that represents an edge, the match results in identifying the position of an edge in an image recovered using the partial coefficients. In accordance with a preferred embodiment of the present invention, pixels in the recovered image on either side of the identified edge are then adjusted using a low pass filter that does not operate simultaneously on pixels on both sides of the edge. This procedure reduces noise in the recovered image without reducing sharpness in the image.

Whereas the above example is given for partial coefficients, the example applies equally well to adjusting recovered transform coefficients and adjusting recovered pixel values.

Variations of the adjustment algorithms discussed above and other algorithms for adjusting partial transform coefficients will occur to persons of the art.

In a preferred embodiment of the present invention, following generation of adjusted data set 50, data set 50 is preferably transformed "back", in a step 52 with partial transform $DCT_1(u,x)$ to generate a data set 54 of regenerated transform coefficients RC(u,v). Values of RC(u,v) are checked for consistency with values of RC*(u,v) or RC (u,v) in a step 56 by comparing values of RC**(u,v) with values of RC*(u,v) or RC (u,v) using an appropriate metric. Preferably, the metric is responsive to differences between values of RC(u,v) and values of RC(u,v) or RC(u,v) and relevant quantization errors and/or adjustment ranges. For example, in some preferred embodiments of the present invention, consistency requires that 2|RC(u,v)–RC(u,v)|/Q(u,v)<1 (Q(u,v) is the quantizer for RC(u,v)).

In decision step 58, if the check for consistency is negative, then procedure 20 returns to step 48 and a new value for at least one PRC*(x,v) of data set 50 is determined using appropriate adjustment algorithms. For example, in accordance with a preferred embodiment of the present invention a new value for a PRC*(x,v) is determined by subtracting from PRC*(x,v) an amount equal to $\alpha$[PRC*(x,v)–PRC(x,v)] where $\alpha$ is a fraction less than one. Data set 50 is then again preferably checked for consistency with RC*(u,v) or RC (u,v). Preferably, new values for at least one PRC*(x,v) of data set 50 are determined until data set 50 satisfies the consistency check performed in step 56.

If the check for consistency is positive, decision step 58 preferably advances procedure 20 to a step 60 (shown in FIG. 2B). In step 60 RC(u,v) data set 54 is transformed to a data set 62 of partial coefficients PRC(u,y) using $IDCT_2$(y,v). Data set 62 is then preferably adjusted and checked in a sequence of steps represented by a process step 64 to produce a data set 66** of adjusted partial coefficients PRC*(u,y). Process step 64 represents a series of step similar to the series of steps used to adjust and check data set 40 comprising PRC(x,v) to produce data set 50 comprising PRC*(x,v). However data set PRC(u,y) can be checked for consistency, in accordance with a preferred embodiment of the present invention, not only with RC(u,v) and/or RC*(u,v) but also with data set 50 of adjusted partial coefficients PRC*(x,v).

In step 68 data set 66 is transformed with partial inverse transform $IDCT_1(x,u)$ to generate recovered image 70 comprising pixel values RI(x,y).

The inventors have found that processing compressed data 22 in accordance with a preferred embodiment of the present invention selectively suppresses noise in recovered image 70 while affecting sharpness of recovered image 70 only moderately. As a result recovered image 70 can be edge enhanced by adjusting pixel values RI(x,y) so as to provide an image that has improved sharpness and reduced noise. Therefore, preferably, procedure 20 comprises a step 72 in which recovered image 70 is edge enhanced to provide a sharpened recovered image 74 comprising pixel values RI*(x,y).

In adjusting pixel values RI(x,y) of image 70 to generate enhanced image 74, preferably an adjustment limit is defined for each pixel value RI(x,y) that is adjusted, which adjustment limit is used to define an adjustment range for the pixel. Each pixel values RI*(x,y) of enhanced image 74 is preferably constrained to have a value that lies within the adjustment range determined for its corresponding pixel value RI(x,y) in recovered image 70. Preferably adjustment limits for pixel values RI*(x,y) are defined responsive to Q(u,v). In some preferred embodiments of the present invention an adjustment limit for RI(x,y) is determined to be equal to an average of values of all or a subset of Q(u,v) multiplied by a fraction less than one. In some preferred embodiments of the present invention an adjustment limit is set equal to a maximum or a minimum value of all or a subset of Q(u,v) multiplied by a fraction less than one. Preferably the fraction in either case is less than one half.

It should be noted that, in accordance with a preferred embodiment of the present invention, it is not required to generate any particular combination of data sets to generate a recovered image from compressed data. For example, in generating recovered image 70 from compressed data 22 it is possible, in accordance with a preferred embodiment of the present invention, to generate and adjust only data sets 26 and 36. Recovered image 70 is then generated directly from data set 36 without generating and adjusting partial coefficients. It is also possible, in accordance with a preferred embodiment of the present invention, to generate recovered image 70 directly from data set 50 without generating data sets 62 or 66.

Quite generally, in accordance with preferred embodiments of the present invention, different combinations of transforms and inverse transforms and permutations of a combination of transforms and inverse transforms can be used to process compressed data. Furthermore, in processing compressed data in accordance with a preferred embodiment of the present invention, any data set generated from the compressed data can be adjusted responsive to a consistency check with any other data set generated from the compressed data (including a set of recovered transform coefficients generated from the data set).

For example, in accordance with preferred embodiments of the present invention different combinations of inverse transforms $IDCT_1$ and $IDCT_2$ and transforms $DCT_1$ and $DCT_2$ can be used in processing compressed data 22. It is possible to apply the transform $IDCT_1(x,u) \cdot DCT_2(v,y)$ to data set 66 comprising PRC*(u,y) to check the consistency of PRC*(u,y) with adjusted partial coefficients PRC*(x,v) of data set 50. It is also possible to transform recovered image 70 of pixel values RI(x,y), or image 74 comprising pixel values RI*(x,y) with $DCT_1(u,x) \cdot DCT_2(v,y)$ and check the resulting data set for consistency with data set 26 comprising the "original" recovered transform coefficients RC(u,v).

It should also be noted that different adjustment algorithms can be applied, in accordance with a preferred embodiment of the present, to different data sets generated from the compressed data and that more than one adjustment algorithm can be applied to the same data set.

Whereas the invention has been described for a two dimensional image compressed using JPEG, the invention applies similarly to n-dimensional images in general and to various different types of n-dimensional images including non-video images such as sound files. The invention also applies to n-dimensional images that are compressed using a separable unitary transform other than a cosine transform.

A preferred embodiment of the present invention is described in a provisional application entitled "Enhancement of Compressed Images" and appendix thereof submitted to the US Patent Office on Jan. 13, 1999, in the name of the same inventors of the present invention, the disclosure of which is incorporated herein by reference.

In the claims and description of the present application, each of the verbs, "comprise", "include" and has, and conjugates thereof, are used to indicate that the object or objects of the verb are not necessarily a complete listing of all the components, elements or parts of the subject or subjects of the verb.

The present invention has been described using non-limiting detailed descriptions of preferred embodiments thereof that are provided by way of example and are not intended to limit the scope of the invention. Variations of embodiments described will occur to persons of the art. The scope of the invention is limited only by the following claims:

The invention claimed is:

1. A method for adjusting an image having a plurality of image values defined in an image space, said image values being generated from compressed data comprising quantized values and a guantizer for each quantized value that are functions of transform coordinates in a transform space, the method comprising:

determining an adjustment range for at least one image value of said plurality of image values responsive to a maximum or a minimum quantizer of a plurality of said quantizers;

determining a value in said adjustment range; and adjusting said image by replacing said at least one image value with said determined value, wherein determining an adjustment range comprises determining an adjustment range responsive to a fraction less than one of the maximum or minimum quantizer.

2. A method according to claim 1, wherein said plurality of said quantizers comprises all quantizers in said compressed data.

3. A method according to claim 1, wherein determining a value comprises determining a value responsive to image values of a different related image.

4. A method according to claim 3, wherein said image and said different related image are color component images of a multicolor color image.

5. A method according to claim 1, wherein determining an adjustment range responsive to a fraction less than one of the maximum or minimum quantizers comprises determining an adjustment range for at least one image value of said plurality of image values responsive to an average of said plurality of quantizers.

\* \* \* \* \*